S. MILLET.
Meat Cutter.
No. 9,748. Patented May 24, 1853.
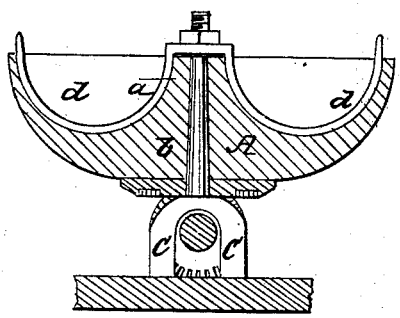
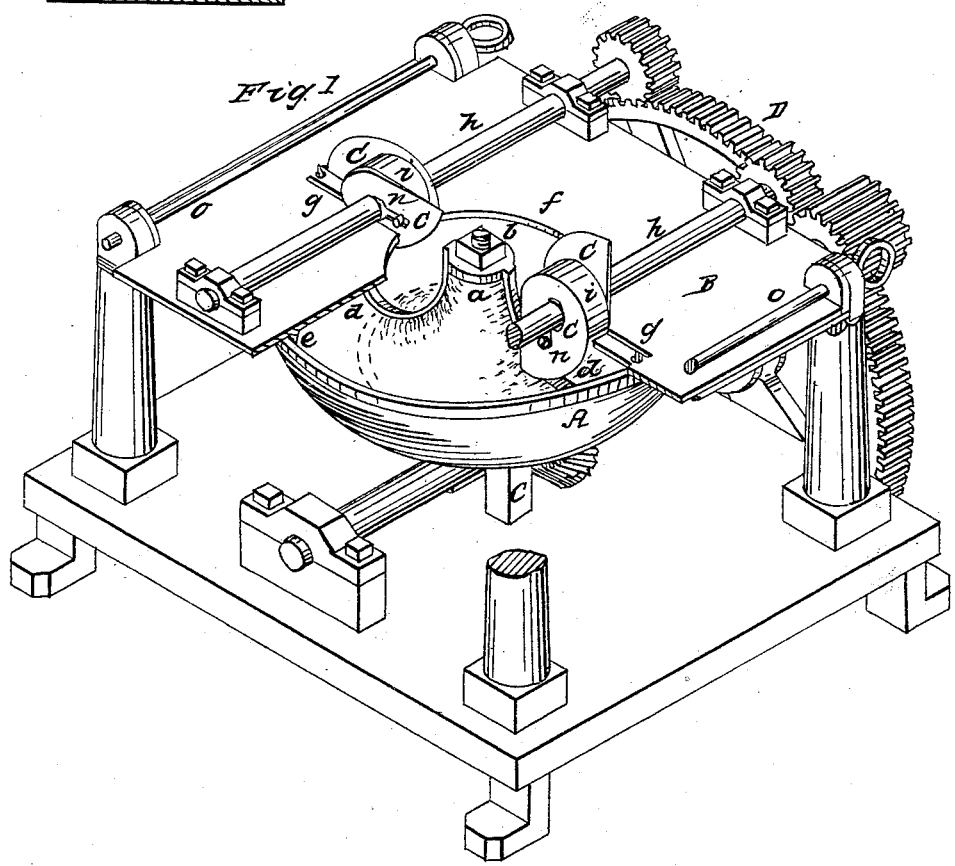

UNITED STATES PATENT OFFICE.

STANISLAS MILLET, OF NEW YORK, N. Y.

MEAT-CUTTER.

Specification of Letters Patent No. 9,748, dated May 24, 1853.

*To all whom it may concern:*

Be it known that I, STANISLAS MILLET, late of France, but now of the city, county, and State of New York, have invented certain new and useful Improvements in Machinery for Subdividing Meats, Vegetables, &c.; and I do hereby declare that the following is a full, clear, and exact description of the same, reference being made to the annexed drawing, making a part of this specification, in which—

Figure I is an isometrical view and Fig. II a section in detail, and similar letters refer to similar parts throughout.

My invention is designed to effect the chopping or mincing of meats, vegetables and all like substances either alimentary or medical which require minute subdivision by cutting.

The machine consists of a revolving disk having a stationary cover fitting tightly at the edge. A pair of cutters play through slits in said cover and act upon the meat within the dish which is made to present itself to their action in all possible directions by the constant rotation of the dish, aided by a pair of scrapers fitting its bottom.

The dish is seen at A. The edge is circular, the inside is shaped like a crater having a central conical elevation as shown at ($a$). The dish is supported upon a spindle ($b$) which is a continuation of a horse shoe ($c$) upon the bed, rotary motion being given by a pair of bevel wheels as seen in Fig. II.

At ($d$) is a strip of steel formed to corresponding curves with a section of the dish. This acts as a scraper, the opposite edges being beveled to form knives. The two points which project above the rim of the dish pass through holes in the cover and thus they are prevented from revolving with the dish hence the edges are kept scraping over its interior as clearly seen in Fig. I.

At B, is the cover. This is a plate supported above the dish A and completely covering it with the exception of a central hole. In the figure, part of the plate is cut away to show the interior arrangements of the dish and the manner in which the several parts act. A circular flange is cast upon the under side, of a diameter equal to the diameter of the inside of the dish, so as to enter within said dish and form a good fit all around as shown at ($e$). Besides the central opening ($f$) there are two pairs of slits ($g$) to allow for the play of the cutters.

The cutters are shown at (C); they consist of steel blades curved on the cutting edges and are eccentrically placed upon the shafts upon which they revolve. The cutter shafts ($h$) are fixed upon the plate B, and when said plate is removed from the dish they are carried with it. The cutters are fixed to these shafts at the center so that the blades will pass through the slits ($g$) as they revolve. To secure the cutters C to the shaft, that is inlayed at the proper place by turning on a cylinder ($i$) on each side of which a cutter is fastened by screws. As the cutters revolve their edges sweep around the bottom and sides of the dish, and in order to adjust them to the right position for this purpose the screws which hold hem pass through slits in said cutters as seen at ($n$). In revolving, the cutters work from the center of the dish toward the circumference. The operation is then as follows: The main driving wheel D being put in motion, rotates the cutters and dish; a quantity of meat is then thrown into the dish. The pair of cutters upon each shaft as they play around pass on each side of the scraper ($d$) which latter keeps the bottom of the dish always free. The edge of the blades C carries a portion of the meat up against the sides of the dish and the top plate. Here it is stopped until a cutter passes through it. The mass as divided is carried around with the dish and comes in contact with the cutters on the opposite side, where it is again submitted to their action. This continues to take place until the whole mass is reduced to the requisite degree of fineness. The bolts (O) are then withdrawn, the top plate B removed, and the dish emptied and made ready for another charge.

In cutting vegetables, or matters which give off a liquid under the process, if desirable to remove said liquid and drain the mass, holes may be made in the bottom of the dish, for the purpose, or it may be made entirely of net work, or wire-gauze, perforated plates, &c.

What I claim as of my own invention is—

The combination of a set or sets of revolving knives or cutters with the top plate and revolving dish formed as described and arranged and operated so as to effect the subdivision of the matter by the action of the cutters upon it in passing through the slots in the covers substantially in the manner set forth herein.

STAS. MILLET.

Witnesses:
F. CORELON,
S. H. MAYNARD.